United States Patent [19]

Butz

[11] 4,405,180
[45] Sep. 20, 1983

[54] WHEEL HUB FOR TWO-WHEELED VEHICLES

[75] Inventor: Hans Butz, Schwebheim, Fed. Rep. of Germany

[73] Assignee: Fichtel & Sachs AG, Schweinfurt, Fed. Rep. of Germany

[21] Appl. No.: 358,298

[22] Filed: Mar. 15, 1982

[30] Foreign Application Priority Data

Apr. 3, 1981 [DE] Fed. Rep. of Germany ........ 3113439

[51] Int. Cl.³ ............................................ B62K 25/02
[52] U.S. Cl. ................................ 301/111; 280/279; 280/288; 280/289 R; 301/105 R; 301/125; 411/312
[58] Field of Search ................... 280/289 R, 287, 288, 280/279; 301/111, 112, 114, 115, 121, 122, 132, 105 B, 124 R, 125; 403/259; 411/312, 272

[56] References Cited

U.S. PATENT DOCUMENTS

| 2,677,984 | 5/1954 | Juy | 280/288 |
| 3,922,018 | 11/1975 | Shook | 301/105 B |
| 4,033,627 | 7/1977 | Morroni | 280/279 |
| 4,145,095 | 3/1979 | Segawa | 301/105 B |

FOREIGN PATENT DOCUMENTS 464381  6/1951  Italy ................................. 301/111

Primary Examiner—Joseph F. Peters, Jr.
Assistant Examiner—Donn McGiehon
Attorney, Agent, or Firm—Toren, McGeady and Stanger

[57] ABSTRACT

A wheel hub for a two-wheeled vehicle, such as a bicycle, includes a quick clamping device for securing the hub axle in the fork of a bicycle frame. The device includes a clamping unit at each end of the hub axle. Each clamping unit contains an adjusting nut screwed onto one end of the axle, a thrust ring inboard of the nut, and a pivotally movable clamping member with eccentric cams positioned between facing surfaces on the nut and thrust ring. By pivoting the clamping member the position of the cams is changed for displacing the clamping device from the release position to the locking position where the hub axle can be tightly clamped in the fork without any special shaping of the axle.

10 Claims, 6 Drawing Figures

WHEEL HUB FOR TWO-WHEELED VEHICLES

SUMMARY OF THE INVENTION

The present invention is directed to a wheel hub, particularly a hub for the driving wheel of a bicycle or the like, and includes a quick-clamping device for securing the hub axle in the bicycle frame.

Quick-clamping devices for the driving wheel of a bicycle are known, note French Pat. No. 1,347,057, in which the hub axle has an axially extending bore arranged to receive a kingpin which passes through the bore and is secured at the opposite ends to the fork parts of the bicycle frame. In such a quick-clamping device the hub axle is very expensive, since it has a bore extending over its entire length. Such a quick-clamping device cannot be used with a drive hub having a bore for a portion of its length arranged to receive a shifting cable.

Therefore, the primary object of the present invention is to provide a quick-clamping device for the wheel hub of a two-wheeled vehicle so that an axial bore through the hub is not necessary, that is, a solid axle can be used, or the clamping device can be used with the hub of a drive wheel including a shifting cable guided in the hub axle over a portion of its length.

In accordance with the present invention, the quick-clamping device includes a pair of clamping units each located on one of the opposite ends of the hub axle. Each unit includes a nut screwed onto the axle and a thrust ring adjacent to and inboard from the nut. A clamping member, including eccentric cams, moves the clamping unit between the release and the locking or clamping positions. The cams extend between facing surfaces on the nut and the thrust ring.

Utilizing such a quick-clamping device it is possible to use a hub axle without an axially extending bore, since such a through bore is unnecessary in the case of a drive hub for a derailleur system or in the case of a gear-assembly hub. Furthermore, this quick-clamping device can be used on a front wheel hub. The structural components making up the quick-clamping device are small in size, they are simple to produce and are economical. With the quick-clamping device embodying the present invention, both the drive wheels and front wheels of bicycles can be installed and replaced in a simple manner.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
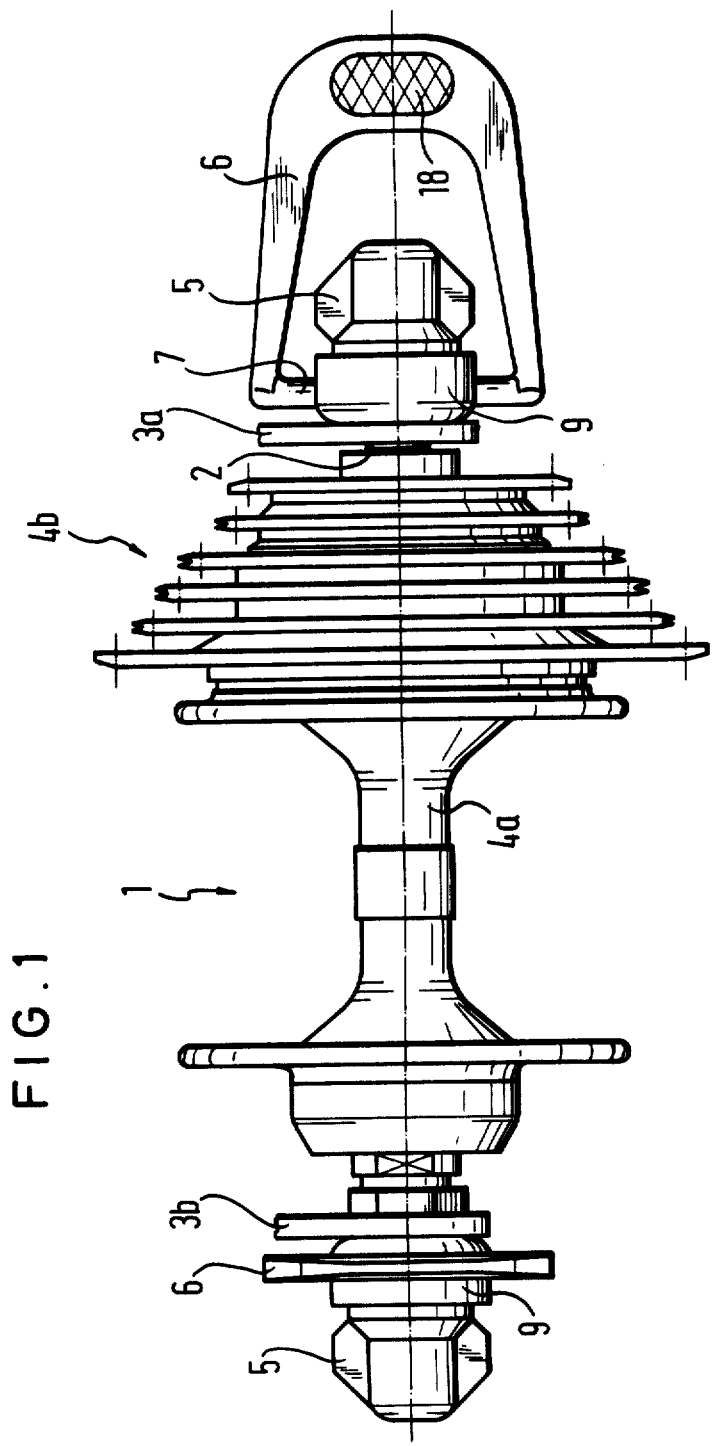
FIG. 1 is a side view of a bicycle drive hub incorporating a quick-clamping device embodying the present invention.
Figure 3:
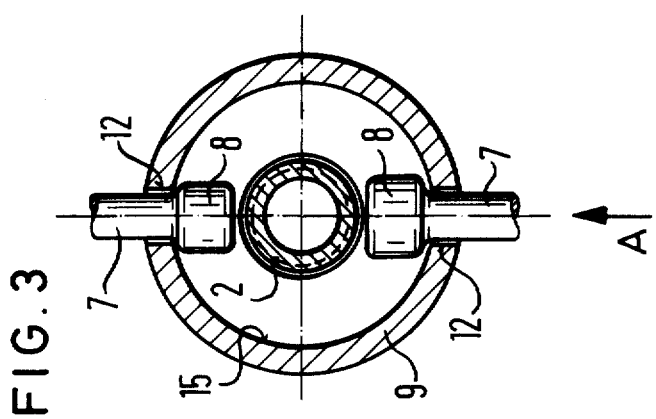
FIG. 3 is a sectional view taken along the line III—III in FIGS. 2a/2b.
Figures 2A, 2B, 2C:
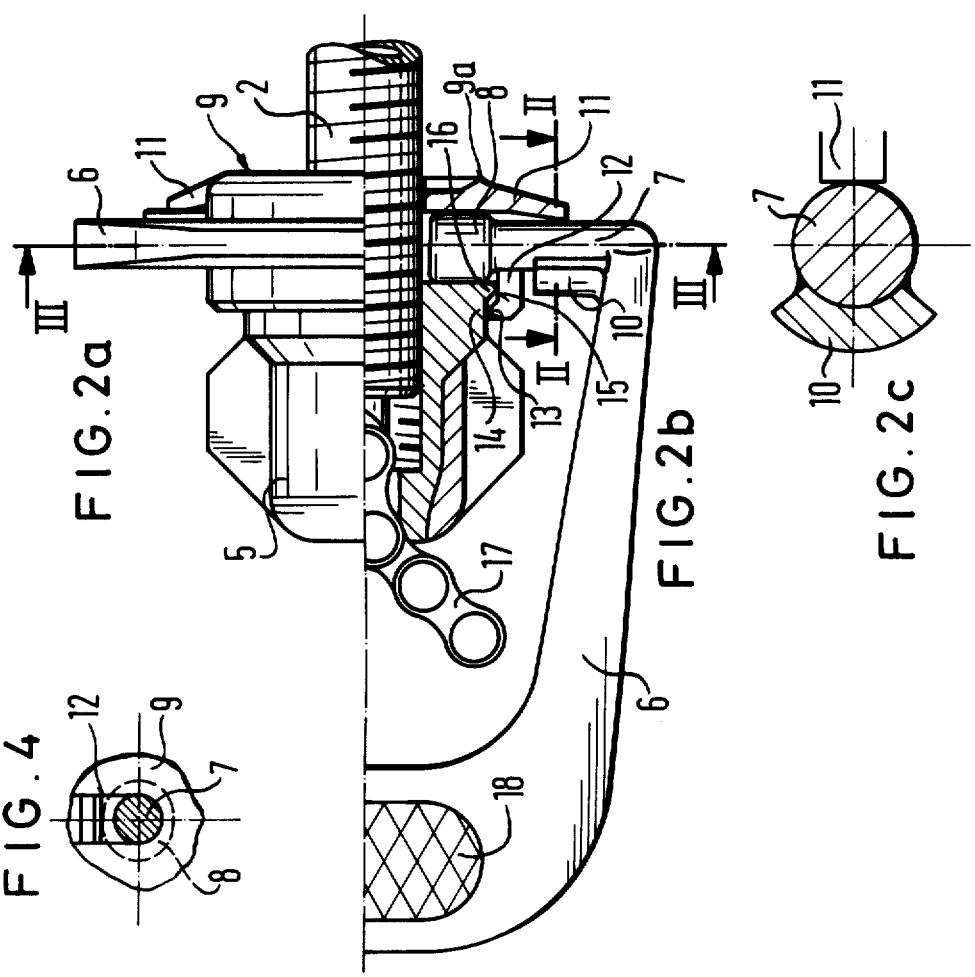
FIG. 2a is a partial side view of a drive hub with a quick-clamping device for a gear-assembly hub, shown in the locked position, and embodying the present invention.
FIG. 2b is a partial sectional view of the quick-clamping device illustrated in FIG. 2a and shown in the released or unlocked position.
FIG. 2c is an enlarged sectional view taken along the line II—II in FIG. 2b.

In FIG. 1 a bicycle drive hub 1 for a derailleur system is shown and includes an axially extending hub axle positioned in the ends 3a, 3b of the rear wheel fork, not shown, of a bicycle frame. A hub sleeve 4a extends axially along and is rotatably supported on the hub axle 2. Hub 1 supports a sprocket wheel set 4b on a drive member. The hub 1 is held in the bicycle fork by a clamping device including adjusting nuts 5 each screwed onto an opposite end of the hub axle. Adjusting nuts 5 are composed of a nut part sprayed with plastic. The hub is changed from the released or unlocked position, shown at the right-hand end of FIG. 1 into the clamped or locked position, shown at the left-hand end of FIG. 1 by pivoting a tightening clamp 6 of the quick-clamping device. Tightening clamp 6 is roughly horseshoe-shaped, note the right-hand end of FIG. 1, with ends 7 extending inwardly from the free ends of the clamp and disposed perpendicularly to the hub axle 2. As can be seen in FIGS. 2b and 3, an eccentric clamping cam 8 is provided at the end of each arm 7 spaced inwardly from the connection of the arm to the clamp 6. Located coaxially on the hub axle 2 and located inboard of the adjusting nut 5 is a thrust ring 9. The adjusting nut is rotatable about the hub axle relative to the thrust ring 9 and in moving the tightening clamp 6 between the released position and the clamped position, the thrust ring can be axially displaced against the ends 3a, 3b of the fork parts on the bicycle frame so that the hub is secured in the bicycle fork.

Tightening clamp 6 can be pivoted about an axis extending through the arms 7, that is, an axis extending perpendicularly to the hub axle 2 so that the position of the eccentric clamping cams 8 is varied relative to the adjusting nut 5 and the thrust ring 9. In the released position shown at the right-hand end of FIG. 1, the tightening clamp 6 extends in a plane parallel to the axis of the hub axle and in the clamped position shown at the left-hand end in FIG. 1 the clamp extends in a plane perpendicular to the hub axis. The pivotal movement of the tightening clamp 6 is limited by stops. As shown in FIG. 2b and 2c a stop cam 10 is secured on the circumferential periphery of one of the arms 7 and it interacts with a cam-shaped counterstop 11 provided on the radially outer peripheral area of the thrust ring 9.

In FIG. 2c the stop cam 10 is shown enlarged and in cross-section on the arm 7. During the pivotal movement of the clamp 6 about the axis of the arms 7, the stop cam 10 contacts the counterstop 11 and in the angularly displaced positions of the eccentric cams 8 providing the released and clamped positions of the device. In movement of the eccentric cams 8, into the released and locked positions, the cams pass through a dead center position so that the eccentric clamping cams 8 are self-locking with the stop cam 10.

In FIG. 3 the arms 7, which extend radially outwardly relative to the hub axle 2, have the clamping cams 8 located at the radially inner ends of the arms 7.

Further, it can be seen in this figure that the thrust ring 9 has diametrically opposite slot-shaped ports 12 through which the arms 7 enter into the thrust ring with the cams 8 located in the space within the thrust ring.

Figure 4:
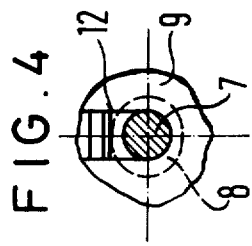
FIG. 4 is a partial sectional view taken in the direction of arrow A in FIG. 3.

In FIG. 4 the shape of the cams 8 at the ends of the arms 7 is shown in detail.

Thrust ring 9 is connected with the adjusting nut 5 with a certain amount of axial play. As can be seen in FIGS. 2b and 3, the thrust ring forms an axially extending, hollow, cylindrically shaped recess 15 with a cylindrically shaped flange-like portion 14 at the adjacent end of the adjusting nut located within the recess. For the axial connection between the adjusting nut 5 and the thrust ring 9 the edge of the thrust ring, defining the recess 15 and closer to the nut, forms a radially inwardly directed edge or individual lugs 13. Lugs 13 extend inwardly relative to a ring-like shoulder 16 formed on the flange-portion 14 and facing away from the bicycle frame. As shown in FIG. 2b, the adjusting nut 5 has an axially extending bore in which the shifting cable 17 is guided. The bore extends for a portion of the axial length of the hub axle. With the quick-clamping device of the present invention, including the adjusting nut 5, the thrust ring 9, and the tightening clamp 6 with the eccentric cam 8, it is possible to combine the device with a hub including a shifting cable 17.

After the adjusting nuts are tightened, the hub axle can be secured in the bicycle fork by manually folding or pivoting the folding clamps 6 about the axes of the arms 7. To aid in securing the hub, a clamping edge or lip 9a is formed on the outer surface of the thrust ring 9 facing toward the other thrust ring. The manual operation of the tightening clamp 6 is facilitated by an easy-to-grip surface 18 formed at the opposite end of the clamp from the arms 7.

As can be seen in FIGS. 2b and 3, the cams 8 on the ends of the arms 7 extend through the slots 12 into the recess 15 formed by the thrust ring. Within the space 15, as can be seen in FIG. 2b, the cams 8 extend between a bearing surface area on the thrust ring 9 within the recess and another bearing surface area on the facing end surface of the adjusting nut 5. By pivoting the clamp 5, the cams 8 move the thrust ring inwardly along the hub axle 2 for securing the hub in the fork parts of the bicycle frame. As the tightening clamp is pivoted the stop 10 secured on the arm 7 travels through an angular distance of at least 180° between the two points of contact with the stop 11 for determining the released and the clamped positions of the clamping device.

While specific embodiments of the invention have been shown and described in detail to illustrate the application of the inventive principles, it will be understood that the invention may be embodied otherwise without departing from such principles.

I claim:

1. Wheel hub for two-wheeled vehicles, such as the rear wheel of a bicycle, comprising a hub axle, a hub sleeve coaxial with and rotatably supported on said hub axle, and quick-clamping means for securing said hub axle in the frame of a two-wheeled vehicle, wherein the improvement comprises that said quick-clamping means comprises a clamping unit at each of the opposite ends of said hub axle outwardly from the opposite ends of said hub sleeve, each said clamping unit comprises a nut and a thrust ring located inwardly of said nut, said thrust ring being movable to a limited extent in the axial direction of said hub axle, each said nut and thrust ring having a bearing surface area disposed in facing relationship and spaced apart in the axial direction of said hub axle, and a clamping member pivotally mounted between said bearing surface areas, and said clamping member including at least one eccentric cam located between and in contact with said bearing surface areas, said eccentric cam being pivotally displaceable relative to said bearing surface areas for selectively axially moving said thrust ring relative to said nut for locking and unlocking said quick-clamping means.

2. Wheel hub, as set forth in claim 1, wherein said clamping member comprises a pair of arms each located on an opposite side of said hub axle, and one said eccentric cam secured on each of said arms.

3. Wheel hub, as set forth in claim 2, wherein said thrust ring defines a hollow cylindrically shaped recess coaxial with said hub axle, the end of said nut closer to said thrust ring has a radially outwardly projecting flange-like portion located within said hollow recess, one of said bearing surface areas formed on the end face of said nut facing into said hollow recess, the other said bearing surface area formed in said hollow recess extending transversely of the hub axle, said thrust ring having slots therein on diametrically opposite sides of said hub axle opening into said hollow recess, each of said arms on said clamping member extending through a different one of said slots with said eccentric cam on said arm located within said hollow recess and between and in contact with said bearing surface areas on said nut and said thrust ring.

4. Wheel hub, as set forth in claim 3, wherein said flange-like portion forms a radially outwardly projecting annular shoulder facing away from said hub sleeve and said thrust ring including means on the circumferential periphery thereof projecting axially beyond said shoulder and arranged to engage said shoulder.

5. Wheel hub, as set forth in claim 1, wherein said thrust ring on the side thereof facing toward said hub sleeve has an annular clamping edge.

6. Wheel hub, as set forth in claim 2, wherein at least one said arm of said clamping member has a stop thereon, a counterstop located on said thrust ring in the path of said stop on said arm when said clamping member is pivoted so that said counterstop limits the angular movement of said clamping member.

7. Wheel hub, as set forth in claim 6, wherein said stop and said counterstop abut against each other in angular positions of said eccentric cams where said eccentric cams have passed a dead center position.

8. Wheel hub, as set forth in claim 6, wherein said stop on said arm of said clamping member is pivotally displaceable between two positions spaced angularly apart by an angular distance of at least 180°.

9. Wheel hub, as set forth in claim 8, wherein said clamping member includes a horseshoe-shaped part connected to the radially outer ends of said arms and said part arranged to pivot said arms and said cams, and said cams are arranged to allow the maximum axial play of said thrust ring relative to said nut when the plane of said horseshoe-shaped part extends parallel to the direction of said hub axle.

10. Wheel hub, as set forth in claim 1, wherein said nut has an axial bore therethrough arranged for the passage of a shifting cable into said hub axle.

* * * * *